(12) United States Patent  (10) Patent No.: US 8,584,588 B2
Larousse et al.  (45) Date of Patent: Nov. 19, 2013

(54) AMMUNITION COMPRISING MEANS FOR NEUTRALIZING ITS EXPLOSIVE CHARGE

(75) Inventors: Didier Larousse, La Ferte Saint-Aubin (FR); Alain Bourel, Orleans (FR); Christophe Bar, Olivet (FR)

(73) Assignee: TDA Armements SAS, La Ferte Saint-Aubin (FR)

( * ) Notice: Subject to any disclaimer, the term of this patent is extended or adjusted under 35 U.S.C. 154(b) by 282 days.

(21) Appl. No.: 12/837,915

(22) Filed: Jul. 16, 2010

(65) Prior Publication Data

US 2012/0240808 A1 Sep. 27, 2012

(30) Foreign Application Priority Data

Jul. 17, 2009 (FR) ...................................... 09 03515

(51) Int. Cl.
*F42D 5/04* (2006.01)
*F42B 39/14* (2006.01)
*F42B 39/20* (2006.01)
*F02K 9/38* (2006.01)

(52) U.S. Cl.
CPC ................. *F42B 39/14* (2013.01); *F42B 39/20* (2013.01); *F02K 9/38* (2013.01)
USPC .......................................... 102/481; 102/473

(58) Field of Classification Search
USPC ..................... 102/481, 200, 202, 473; 60/223
See application file for complete search history.

(56) References Cited

U.S. PATENT DOCUMENTS

| | | | | |
|---|---|---|---|---|
| 3,887,991 A * | 6/1975 | Panella | ........................... | 29/450 |
| 4,709,637 A * | 12/1987 | Boggero | ........................ | 102/481 |
| 5,035,180 A * | 7/1991 | Purcell et al. | .................. | 102/481 |
| 5,035,181 A * | 7/1991 | Jacks et al. | ..................... | 102/481 |
| 5,044,154 A | 9/1991 | English, Jr. et al. | | |
| 5,129,326 A * | 7/1992 | Brogan | ........................... | 102/481 |
| 5,155,298 A * | 10/1992 | Koontz | ........................... | 102/481 |
| 5,361,703 A * | 11/1994 | Braithwaite | ................... | 102/481 |
| 5,394,803 A * | 3/1995 | Mort | .............................. | 102/377 |
| 5,507,231 A * | 4/1996 | Moore et al. | .................. | 102/374 |
| 5,786,544 A * | 7/1998 | Gill et al. | ..................... | 102/481 |
| 5,813,219 A * | 9/1998 | Gill et al. | ......................... | 60/223 |
| 6,321,656 B1* | 11/2001 | Johnson | ......................... | 102/377 |
| 7,051,511 B2* | 5/2006 | Prytz | ............................... | 60/223 |
| 7,353,755 B2* | 4/2008 | Aumasson et al. | ........... | 102/481 |
| 7,373,885 B2* | 5/2008 | Skinner | ......................... | 102/481 |
| 7,549,375 B2* | 6/2009 | Cook et al. | ..................... | 102/377 |
| 8,082,846 B2* | 12/2011 | Cook et al. | ..................... | 102/377 |
| 2002/0020323 A1* | 2/2002 | Dassis | .............................. | 102/481 |
| 2006/0027126 A1* | 2/2006 | Aumasson et al. | ........... | 102/481 |
| 2006/0054046 A1* | 3/2006 | Cook et al. | ..................... | 102/481 |
| 2010/0024675 A1 | 2/2010 | Cotet et al. | | |
| 2010/0089272 A1* | 4/2010 | Cook et al. | ..................... | 102/481 |

FOREIGN PATENT DOCUMENTS

| | | |
|---|---|---|
| FR | 2608265 A1 | 6/1988 |
| FR | 2791425 A1 | 9/2000 |
| FR | 2906606 A1 | 4/2008 |
| GB | 1 440 753 A | 6/1976 |

* cited by examiner

*Primary Examiner* — James Bergin
(74) *Attorney, Agent, or Firm* — Baker & Hostetler LLP

(57) ABSTRACT

The invention relates to an ammunition comprising an explosive charge confined in a compartment and a deconfinement device capable of deconfining the explosive charge under a pressure or temperature rise within the ammunition. The invention neutralizes the ammunition on command. According to the invention, the ammunition further includes means for activating the deconfinement device, these means being controllable.

6 Claims, 2 Drawing Sheets

AMMUNITION COMPRISING MEANS FOR NEUTRALIZING ITS EXPLOSIVE CHARGE

CROSS-REFERENCE TO RELATED APPLICATIONS

This application claims priority to foreign France patent application No. 0903515, filed on Jul. 17, 2009, the disclosure of which is hereby incorporated by reference in its entirety.

TECHNICAL FIELD

The invention relates to an ammunition comprising an explosive charge confined in a compartment and to a deconfinement device capable of deconfining the explosive charge through the effect of a rise in pressure or temperature within the ammunition. The invention applies notably to the in-flight neutralization of ammunitions.

BACKGROUND OF THE INVENTION

In current conflicts, armed forces are often near civilian areas, or even based in areas of civilian habitation. To avoid collateral damage, in particular to prevent the risk of harming civilian populations, modern ammunitions are becoming increasingly sophisticated. Ammunitions may notably be designed to cause damage over a relatively limited perimeter and may also be provided with guiding means. Guiding generally results in better impact precision. It therefore makes it possible to destroy a target with a limited risk of hitting the neighbouring environment. The ammunition may be guided by a ground guiding system or by a device incorporated into the ammunition. A ground guiding system makes it possible to redirect the ammunition if it is sufficiently anticipated. A redirection may be necessary for example if the target has moved or if the objective has been changed. However, an ammunition incorporating a guiding device generally becomes completely autonomous after it has been launched. It is then no longer possible to modify the target. Whatever the type of guiding, safety problems arise in several circumstances. For example, the ammunition may adopt an aberrant trajectory, that is to say a trajectory not enabling it to reach its target. The ammunition may also encounter an obstacle in its path. Finally, the mission may have to be abandoned for various reasons, notably should the presence of civilians near the target be discovered after the ammunition has been launched. These safety problems create a need to be able to neutralize an ammunition after it has been launched. The expression "neutralize the ammunition" is understood to mean the ability to prevent its explosive charge from exploding, that is to say to prevent it decomposing in a few microseconds. Furthermore, the capability of neutralizing an ammunition may also prove necessary even if the ammunition has not been launched.

The neutralization of an unlaunched ammunition is for example of interest when the place where it is stored is threatened with an attack. It is then desirable for the ammunition, which may be close to allied military forces, to be prevented from exploding.

SUMMARY OF THE INVENTION

The invention notably provides a solution for neutralizing, on command, an ammunition, whether or not it has been launched. For this purpose, the subject of the invention is an ammunition comprising an explosive charge confined in a compartment and a deconfinement device capable of deconfining the explosive charge under a pressure or temperature rise within the ammunition, characterized in that it includes means for activating the deconfinement device, said means being controllable.

The invention notably has the advantage that the explosion of the ammunition may be prevented at any moment before its impact. In particular, even if it is impossible to turn the ammunition away from its target, the invention enables it to be made less destructive. In addition, if the ammunition has already been fitted with a deconfinement device, very few structural modifications are necessary in order to make it in accordance with the invention.

BRIEF DESCRIPTION OF THE DRAWINGS

The invention will be better understood and other advantages will become apparent on reading the detailed description of an embodiment given by way of example, the description being accompanied by the appended drawings which show.

DETAILED DESCRIPTION

Figure 1:
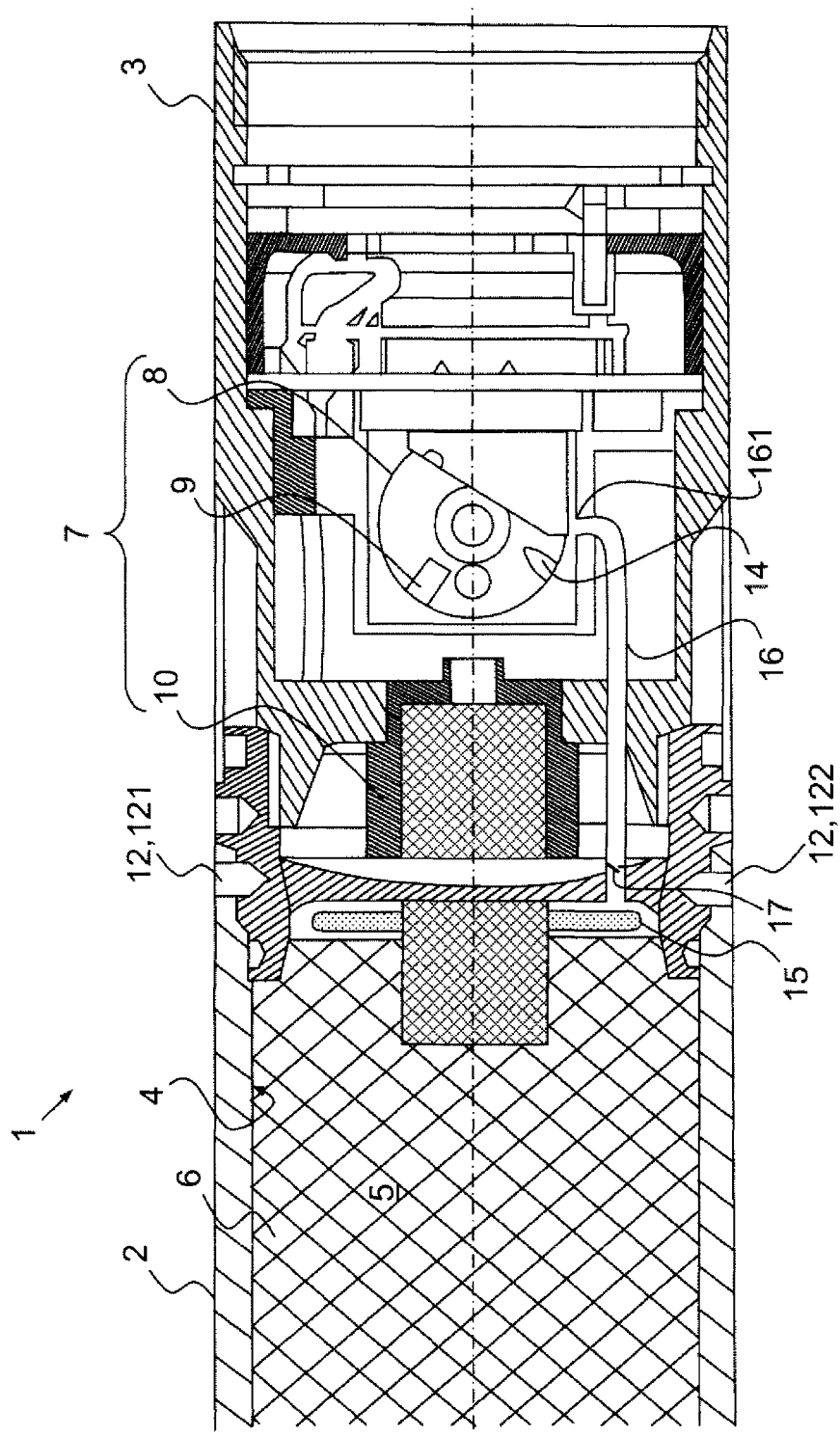
FIG. 1, an example of an ammunition according to the invention in a partial sectional view in a longitudinal plane thereof, the ammunition being in the safety position.
Figure 2:
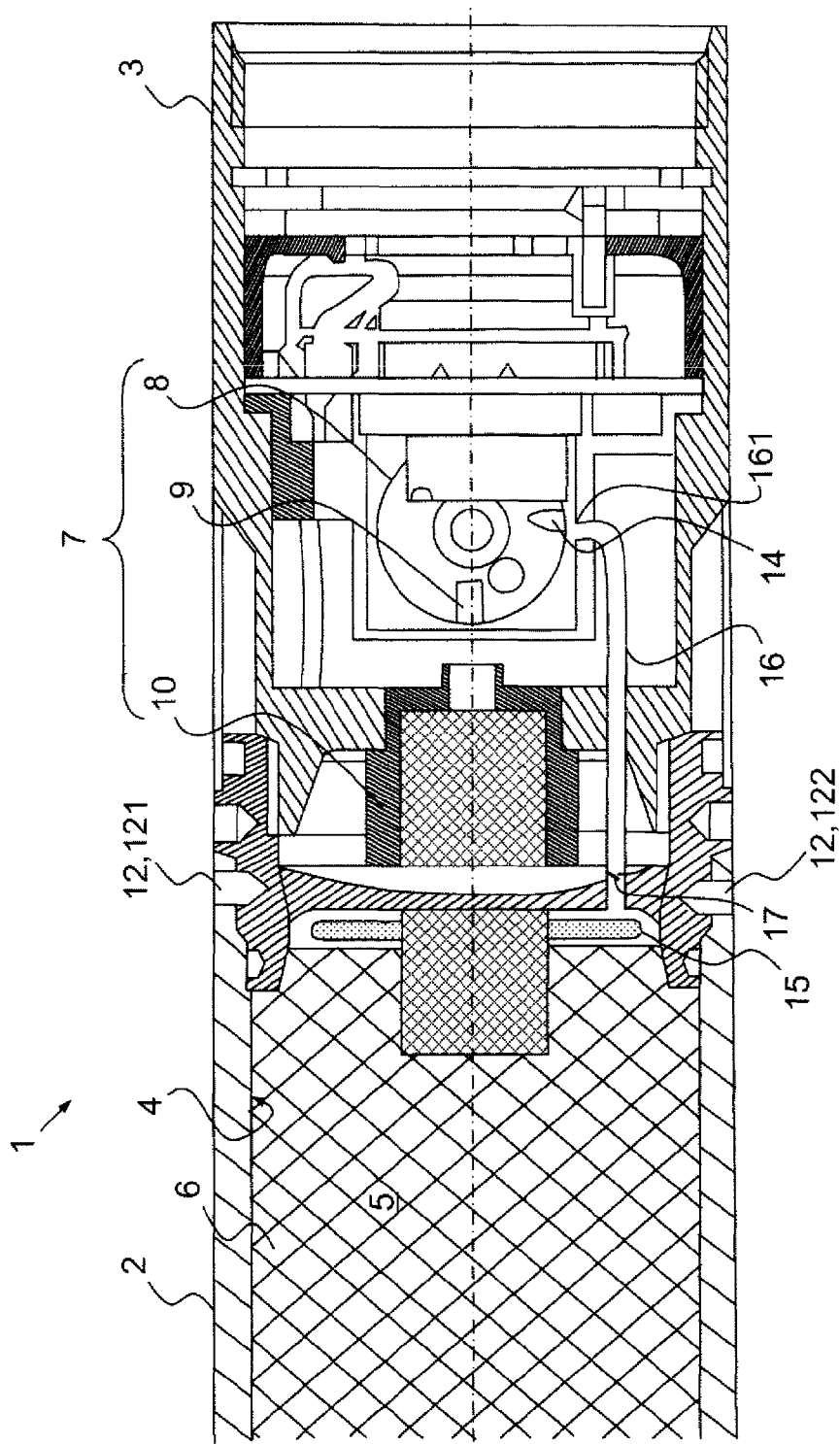
FIG. 2, the ammunition of FIG. 1 in the same view as in FIG. 1, the ammunition being in the aligned position.

FIG. 1 shows an example of an ammunition according to the invention in a partial sectional view in a longitudinal plane thereof. In this figure, the ammunition is in the safety position. FIG. 2 shows the same ammunition example as that of FIG. 1 in which the ammunition is in the aligned position. For the rest of the description, the ammunition is considered to be a rocket. However, the invention applies to any type of ammunition that contains an explosive charge, notably missiles and projectiles. The rocket 1 comprises a body 2 of elongate shape and a safety and arming device 3 lying along the extension of the body 2. The safety and arming device 3 is assembled at one of its ends to the body 2, so as to form a cap, and at another end to a propulsion unit (not shown) capable of delivering a thrust in order to propel the rocket 1. The body 2 and the safety and arming device 3 form a sealed casing 4 defining a compartment 5. The compartment 5 contains an explosive charge 6. The safety and arming device 3 comprises a pyrotechnic priming chain 7 capable of triggering the explosion of the explosive charge 6. The pyrotechnic priming chain 7 comprises for example a rotor 8, a detonator 9 and a pyrotechnic relay 10. The detonator 9 is mounted on the rotor 8 so as to be able to come into alignment with a first end of the pyrotechnic relay 10, as shown in FIG. 2, by a rotational movement of the rotor 8. A second end of the pyrotechnic relay 10 opens into the compartment 5 so as to be able to trigger the explosion of the explosive charge 6. In FIG. 1, the pyrotechnic priming chain 7 is represented in what is called the safety position, also called the misaligned position in so far as the detonator 9 is not aligned with the pyrotechnic relay 10. In this position, triggering the detonator 9 does not operate the pyrotechnic relay 10. Thus, even should the detonator 9 be accidentally triggered, there is no risk of the rocket 1 exploding. The rocket 1 also includes a deconfinement device 12. The deconfinement device 12 allows the explosive charge 6 to be deconfined from its compartment 5 for the purpose of preventing a violent reaction of the explosive charge 6 when it reaches its decomposition temperature. The deconfinement device 12 falls within the context of the MURAT label, in which MURAT is the French acronym for "munition à risques atténués", meaning low vulnerability ammunition. A low vulnerability ammunition is an ammunition which satisfies the requirements in terms of performance, availability and operation and for which the probability of inopportune initiation, together with the violence of the reaction and the collateral damage that would result when the ammunition is accidentally actuated, is reduced to the minimum. In particular, the deconfinement device 12 makes the rocket 1 insensitive to thermal attack, such as fires and external heating that may occur accidentally on the site where the rocket is stored. The deconfinement device 12 comprises for example assembly pins 121, 122 that couple the body 2 to the safety and arming device 3. These pins 121, 122 are designed to rupture under a pressure or temperature rise within the compartment 5. Should the pins 121, 122 rupture, the body 2 and the safety and arming device 3 are decoupled, the sealing between the casing 4 and the compartment 5 being lost. Any rise in internal pressure is then prevented. The deconfinement device 12 may for example make use of the change in phase (solid phase to liquid phase) of the explosive charge 6 when its temperature increases. The phase change means that the density of the explosive charge 6 decreases and therefore the pressure in the compartment 5 increases. This pressure generates a thrust force that ruptures the pins 121, 122. The pins 121, 122 may also be ruptured by initiating the decomposition of the explosive charge 6. Decomposition of the explosive charge 6 is accompanied by substantial gas generation. The gases then cause the pressure rise necessary for mechanically rupturing the pins 121, 122. After such a rupture, the explosive charge 6, or its decomposition gases, may escape freely and prevent an internal pressure rise. The explosive charge 6 may possibly continue to decompose, but without an increase in pressure. Therefore, there is no risk of the decomposition reaction getting out of control. The rocket 1 is deactivated. In the example described with reference to FIG. 1, the deconfinement device 12 comprises assembly pins 121, 122. Of course, any other mechanical link having a predetermined point of rupture may be envisaged for coupling the body 2 to the safety and arming device 3 without departing from the scope of the invention. More generally, the deconfinement device 12 may be any means for destroying the sealing of the compartment 5.

According to the invention, the rocket 1 comprises controllable means for activating the deconfinement device. These means consist of technical means for intentionally activating the deconfinement device 12 in response to a command by an operator or a controller. They comprise for example an igniter 14 and a powder charge 15. The term "igniter" is understood to mean any device capable of producing a flame, hot gases and/or hot particles allowing the combustion of a powder charge. In one particular embodiment, the powder charge 15 is placed in the compartment 5 with the explosive charge 6. This embodiment enables the temperature and pressure to rise within the compartment 5 both directly, by the combustion of the powder charge 15, and indirectly, by slow decomposition of the explosive charge 6 caused by the combustion of the powder charge 15 in the vicinity thereof. It should be noted that not all types of explosive charge decompose with the combustion of a powder charge. The pressure rise is then due only to the combustion of the powder charge 15. This pressure rise in the compartment 5 enables the deconfinement device 12 to be activated. In the example shown in FIGS. 1 and 2, the pressure rise generates forces tending to shear the pins 121, 122 in the same way as if the rocket 1 were subjected to accidental thermal heating.

According to one particular embodiment, shown notably in FIGS. 1 and 2, the means for activating the deconfinement device furthermore include a channel 16 capable of connecting an outlet of the igniter 14 to the powder charge 15. This channel 16 enables the flame, the hot gases and/or the hot particles to be guided right to the powder charge 15, notably when the igniter 14 is not located in the immediate vicinity of the powder charge 15. The igniter 14 is for example fitted into the safety and arming device 3. Advantageously, the channel 16 includes a non-return valve 17 that opens to allow the flame, hot gases and/or hot particles to flow to the powder charge 15. In the closed position, said valve seals the casing 4 and therefore allows the pressure to rise inside the compartment 5.

In an alternative embodiment, the igniter 14 is mounted on the rotor 8. It is preferably mounted so that its outlet comes into alignment with one end 161 of the channel 16 at the same time that the detonator 9 comes into alignment with the pyrotechnic relay 10. This alternative embodiment allows a mission in flight to be rapidly abandoned. This is because when an ammunition is in flight, the detonator 9 and the pyrotechnic relay 10 are aligned. The deconfinement device 12 may thus be activated without having to modify the position of the rotor 8 beforehand.

According to one particular embodiment (not shown), the means for activating the deconfinement device comprise means for detecting that the trajectory actually followed by the rocket 1 is deviating from a predetermined trajectory. These means may be only partly installed in the rocket 1. This is for example the case when the actual trajectory of the rocket 1 is tracked by a radar or with the aid of a global navigation satellite system, such as a GPS (global positioning system) device. If it is detected that the rocket 1 is following a trajectory incompatible with its objective, the rocket 1 can then be neutralized by the means for activating the deconfinement device 12.

According to another particular embodiment, the means for activating the deconfinement device comprise means for receiving a rocket neutralization command, this command being issued remotely. Said means may for example be a radio receiver capable of receiving a signal transmitted by an operator or a controller.

What is claimed is:

1. An ammunition comprising:
   an explosive charge confined in a compartment,
   a deconfinement device capable of deconfining the explosive charge under a pressure or temperature rise within the compartment, and
   a deconfinement device activation system comprising a powder charge placed in the compartment and an igniter for controllably enabling a pressure or temperature rise within the compartment through combustion of the powder charge.

2. The ammunition of claim 1, wherein the compartment is formed by coupling at least two parts, the deconfinement device comprising a mechanical link for coupling the two parts of the compartment and being designed to rupture under a pressure or temperature rise in the compartment.

3. The ammunition of claim 1, wherein the deconfinement device activation system furthermore includes a channel capable of connecting an outlet of the igniter to the powder charge, the channel including a non return valve allowing the gases and/or particles to flow from the igniter to the powder charge.

4. The ammunition of claim 3, further including a pyrotechnic priming chain comprising a detonator and a pyrotechnic relay, the detonator and the igniter being mounted on a rotor so as to be able to come into alignment simultaneously with the pyrotechnic relay and one end of the channel respectively.

5. The ammunition of claim 1, wherein the deconfinement device activation system comprises means for detecting that an actual trajectory of the ammunition is deviating from a predetermined trajectory.

6. The ammunition of claim 1, wherein the deconfinement device activation system comprises means for receiving an ammunition neutralization command, so as to neutralize the ammunition, the command being issued remotely.

* * * * *